United States Patent
Torikoshi

(10) Patent No.: US 10,051,562 B2
(45) Date of Patent: Aug. 14, 2018

(54) COMMUNICATION APPARATUS, POWER CONTROL METHOD, AND RECORDING MEDIUM

(71) Applicant: Makoto Torikoshi, Kanagawa (JP)

(72) Inventor: Makoto Torikoshi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 36 days.

(21) Appl. No.: 15/207,996

(22) Filed: Jul. 12, 2016

(65) Prior Publication Data

US 2017/0019229 A1     Jan. 19, 2017

(30) Foreign Application Priority Data

Jul. 17, 2015   (JP) ................................. 2015-142836

(51) Int. Cl.
    *H04W 52/02*     (2009.01)
    *H04L 29/06*     (2006.01)

(52) U.S. Cl.
    CPC .............. *H04W 52/02* (2013.01); *H04L 69/16* (2013.01); *Y02D 30/30* (2018.01); *Y02D 70/00* (2018.01)

(58) Field of Classification Search
    CPC ..... G06F 1/3206; G06F 1/324; H04L 5/0053; H04L 12/40039; H04L 47/10; H04L 47/11; H04L 47/12; H04L 47/27; H04L 47/30; H04L 49/90; H04L 49/9005; H04L 69/16; H04L 2012/5635; H04W 28/10; H04W 52/02; H04W 52/343; Y02B 60/05; Y02B 30/30; Y02B 60/50; Y02B 70/00

See application file for complete search history.

(56) References Cited

U.S. PATENT DOCUMENTS

| | | | | |
|---|---|---|---|---|
| 5,764,625 A | * | 6/1998 | Bournas | H04L 47/10 370/231 |
| 5,768,527 A | * | 6/1998 | Zhu | H04L 1/0002 348/E5.008 |
| 6,292,834 B1 | * | 9/2001 | Ravi | H04L 29/06027 375/E7.004 |
| 6,379,195 B1 | * | 4/2002 | Torikoshi | H01R 9/2466 439/733.1 |

(Continued)

FOREIGN PATENT DOCUMENTS

| | | | | |
|---|---|---|---|---|
| JP | 2004-192256 | | 7/2004 | |
| JP | 2009-119617 | | 6/2009 | |
| JP | WO 2011036711 A1 | * | 3/2011 | ............. H04L 12/12 |

*Primary Examiner* — Eric Nowlin
(74) *Attorney, Agent, or Firm* — Oblon, McClelland, Maier & Neustadt, L.L.P.

(57) ABSTRACT

A communication apparatus includes: a transceiver configured to receive a receive window size for use in communication with at least one communication destination communication apparatus from the at least one communication destination communication apparatus; a power-mode determining unit configured to determine a power mode to which transition is to be made, based on the receive window size received by the transceiver; a protocol stack unit configured to request the power-mode determining unit to determine the power mode at a time after transmitting and receiving data to and from the at least one communication destination communication apparatus; and a power-mode control unit configured to control electric power in accordance with the power mode determined by the power-mode determining unit.

9 Claims, 12 Drawing Sheets

(56) References Cited

U.S. PATENT DOCUMENTS

| | | | | |
|---|---|---|---|---|
| 6,438,630 B1* | 8/2002 | DeMoney | H04N 21/2312 | 348/E5.008 |
| 6,700,869 B1* | 3/2004 | Falco | H04L 47/10 | 370/230 |
| 6,701,372 B2* | 3/2004 | Yano | H04L 29/06 | 370/231 |
| 6,988,144 B1* | 1/2006 | Luken | H04L 47/10 | 370/510 |
| 7,016,970 B2* | 3/2006 | Harumoto | H04L 47/10 | 375/E7.002 |
| 7,047,308 B2* | 5/2006 | Deshpande | H04L 29/06027 | 370/230 |
| 7,194,020 B1* | 3/2007 | Farag | H04W 52/028 | 375/148 |
| 7,372,814 B1* | 5/2008 | Chiruvolu | H04L 43/16 | 370/235 |
| 7,599,399 B1* | 10/2009 | Bugenhagen | H04L 47/10 | 370/426 |
| 7,606,928 B2* | 10/2009 | Wang | H04L 29/06027 | 709/231 |
| 7,756,028 B2* | 7/2010 | Fortin | H04L 41/5025 | 370/230.1 |
| 7,912,911 B2* | 3/2011 | Way | H04L 47/10 | 370/229 |
| 7,974,299 B1* | 7/2011 | Banerjea | H04L 47/122 | 370/431 |
| 8,072,888 B2* | 12/2011 | Malhotra | H04L 47/10 | 370/235 |
| 8,125,909 B2* | 2/2012 | McCann | H04L 47/10 | 370/235 |
| 8,254,403 B2* | 8/2012 | Hashimoto | H04L 47/10 | 370/230 |
| 8,396,086 B1* | 3/2013 | Gossett | H04W 74/08 | 370/236 |
| 8,504,002 B2* | 8/2013 | Lenart | H04W 52/0225 | 455/418 |
| 8,542,698 B1* | 9/2013 | Banerjea | H04L 47/122 | 370/431 |
| 8,665,902 B2* | 3/2014 | Powell | H04L 12/413 | 370/466 |
| 8,717,875 B2* | 5/2014 | Bejerano | H04L 45/66 | 370/218 |
| 8,855,693 B2* | 10/2014 | Pantelidou | H04W 52/02 | 370/412 |
| 8,861,358 B2* | 10/2014 | Croft, Jr. | H04L 12/2801 | 370/230 |
| 8,861,541 B1* | 10/2014 | Banerjea | H04L 47/122 | 370/431 |
| 8,873,671 B2* | 10/2014 | Sampath | H03M 13/45 | 375/221 |
| 8,910,168 B2* | 12/2014 | Mital | G06F 9/46 | 718/101 |
| 9,048,946 B1* | 6/2015 | Roberts | H04J 3/0682 | |
| 9,077,619 B2* | 7/2015 | Edsall | H04L 43/08 | |
| 9,124,427 B2* | 9/2015 | Ho | H04W 28/10 | |
| 9,164,065 B2* | 10/2015 | Hood | G01N 29/14 | |
| 9,179,357 B2* | 11/2015 | Manna | H04W 28/0278 | |
| 9,204,203 B2* | 12/2015 | Brockmann | H04N 21/64753 | |
| 9,264,368 B2* | 2/2016 | Swarbrick | H04L 25/02 | |
| 9,357,498 B2* | 5/2016 | Lenart | H04W 52/0225 | |
| 9,509,622 B2* | 11/2016 | Edsall | H04L 43/08 | |
| 9,674,872 B2* | 6/2017 | Wan | H04W 74/0833 | |
| 9,736,521 B2* | 8/2017 | Shaool | H04N 21/4104 | |
| 2003/0033425 A1* | 2/2003 | Deshpande | H04L 1/0002 | 709/233 |
| 2003/0037158 A1* | 2/2003 | Yano | H04L 29/06 | 709/232 |
| 2003/0061371 A1* | 3/2003 | Deshpande | H04L 29/06027 | 709/232 |
| 2003/0103460 A1* | 6/2003 | Kamath | H04L 47/10 | 370/236.2 |
| 2004/0066775 A1* | 4/2004 | Grovenburg | H04J 3/0682 | 370/350 |
| 2005/0021830 A1* | 1/2005 | Urzaiz | H04L 47/10 | 709/234 |
| 2007/0253333 A1* | 11/2007 | Fortin | H04L 41/5025 | 370/230.1 |
| 2008/0039128 A1* | 2/2008 | Ostman | H04W 52/362 | 455/522 |
| 2008/0122487 A1* | 5/2008 | Buell | H03K 19/01721 | 326/80 |
| 2008/0225879 A1* | 9/2008 | Powell | H04L 12/413 | 370/445 |
| 2009/0052322 A1* | 2/2009 | Simonsson | H04W 28/20 | 370/235 |
| 2009/0055550 A1* | 2/2009 | Way | H04L 47/10 | 709/233 |
| 2009/0125739 A1 | 5/2009 | Satoh | | |
| 2011/0096665 A1* | 4/2011 | McCann | H04L 47/10 | 370/235 |
| 2011/0319064 A1* | 12/2011 | Lenart | H04W 52/0225 | 455/418 |
| 2012/0263185 A1* | 10/2012 | Bejerano | H04L 45/04 | 370/401 |
| 2013/0067037 A1* | 3/2013 | Yoshida | H04N 21/47202 | 709/219 |
| 2013/0115992 A1* | 5/2013 | Pantelidou | H04W 52/0235 | 455/517 |
| 2013/0195210 A1* | 8/2013 | Swarbrick | H04L 25/02 | 375/259 |
| 2013/0243007 A1* | 9/2013 | Ding | H04L 47/58 | 370/412 |
| 2013/0301504 A1* | 11/2013 | Lenart | H04W 52/0225 | 370/311 |
| 2014/0009340 A1* | 1/2014 | Meador | G01S 5/0284 | 342/458 |
| 2014/0036748 A1* | 2/2014 | Mukherjee | H04W 52/0212 | 370/311 |
| 2014/0119294 A1* | 5/2014 | Ho | H04W 28/10 | 370/329 |
| 2014/0260638 A1* | 9/2014 | Hood | G01N 29/14 | 73/647 |
| 2015/0131426 A1* | 5/2015 | Wan | H04W 74/0833 | 370/203 |
| 2015/0181273 A1* | 6/2015 | Shaool | H04H 60/15 | 725/31 |
| 2016/0057044 A1* | 2/2016 | Koc | H04W 52/0209 | 370/311 |
| 2016/0302089 A1* | 10/2016 | Schmidt | H04W 24/08 | |
| 2017/0005574 A1* | 1/2017 | Wyland | H02M 3/158 | |
| 2017/0019229 A1* | 1/2017 | Torikoshi | H04L 5/0053 | |
| 2017/0029107 A1* | 2/2017 | Emami | B64C 39/024 | |
| 2017/0078913 A1* | 3/2017 | Chang | H04W 28/0273 | |
| 2017/0156078 A1* | 6/2017 | Lee | H04L 45/02 | |
| 2017/0184704 A1* | 6/2017 | Yang | G01S 7/4816 | |

\* cited by examiner

FIG.7

| DETERMINATION CRITERION | POWER MODE |
|---|---|
| Rx Empty | High Power |
| Rx Mid | Mid Power |
| Rx Full | Low Power |

COMMUNICATION APPARATUS, POWER CONTROL METHOD, AND RECORDING MEDIUM

CROSS-REFERENCE TO RELATED APPLICATIONS

The present application claims priority under 35 U.S.C. § 119 to Japanese Patent Application No. 2015-142836, filed Jul. 17, 2015. The contents of which are incorporated herein by reference in their entirety.

BACKGROUND OF THE INVENTION

1. Field of the Invention

The present invention relates to a communication apparatus, a power control method, and a recording medium.

2. Description of the Related Art

Conventionally, there is a demand for reducing power consumption of communication devices used in embedded devices. In response to such a demand, for example, a technique of changing a power mode depending on a type of a packet and a technique of changing a power mode depending on the number of packets stored in a receive buffer have been devised. A technique of changing a power mode depending on a data traffic rate and a technique of calculating a predicted sleep duration using a value output from a protocol timer to change a power mode have also been devised.

It is known that, in TCP (Transmission Control Protocol), which is a communication protocol, a connection/session is established before transmitting and receiving data to perform communication and that a transmission destination sends an ACK (acknowledgement) packet as a response to data communication from a transmission source. It is also known that timers, such as a retransmission timer and a duration timer, are managed and that buffers involved in transmission and reception are managed. In particular, when the communication partner's receive window (buffer) is full, the transmission source suspends transmission until receiving a notice indicating that space becomes available in the receive window.

For example, Japanese Unexamined Patent Application Publication No. 2004-192256 discloses a configuration in which transmission and reception intervals and/or a value output from a protocol timer are utilized to calculate a predicted sleep duration to switch a power mode, in order to reduce power consumption of a communication device.

According to Japanese Unexamined Patent Application Publication No. 2004-192256, the power mode is switched depending on the communication-related data. However, this technique cannot solve a problem that electric power is wasted in a case where data transmission is suspended. More specifically, according to Japanese Unexamined Patent Application Publication No. 2004-192256, as illustrated in FIG. 12, a predicted sleep duration is set on the basis of a response (b) at the time of data transmission (a) from the communication device, and power mode transition is made in accordance with the predicted sleep duration. However, as illustrated in FIG. 13, the communication partner's receive buffer may be full, and an ACK reporting that the receive window size is zero may be returned (c). In this case, although the communication device makes power mode transition in accordance with the predicted sleep duration, the communication partner's receive buffer is full and the communication device cannot transmit data, which results in waste of electric power.

Thus, the power-mode control method of the conventional technique has the following problem that can occur in packet transmission from an embedded system. That is, even though the power mode is changed to a high-power-consumption mode to increase efficiency in packet transmission, the need of suspending transmission or retransmitting a packet can arise depending on capacity of the communication partner and, during the period over which transmission is suspended or the packet is retransmitted, power is consumed uselessly.

SUMMARY OF THE INVENTION

According to one aspect of the present invention, a communication apparatus includes a transceiver, a power-mode determining unit, a protocol stack unit and a power-mode control unit. The transceiver is configured to receive a receive window size for use in communication with at least one communication destination communication apparatus from the at least one communication destination communication apparatus. The power-mode determining unit is configured to determine a power mode to which transition is to be made, based on the receive window size received by the transceiver. The protocol stack unit is configured to request the power-mode determining unit to determine the power mode at a time after transmitting and receiving data to and from the at least one communication destination communication apparatus. The power-mode control unit is configured to control electric power in accordance with the power mode determined by the power-mode determining unit.

BRIEF DESCRIPTION OF THE DRAWINGS

FIG. 7 is a diagram illustrating an example of a power-mode determination table;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
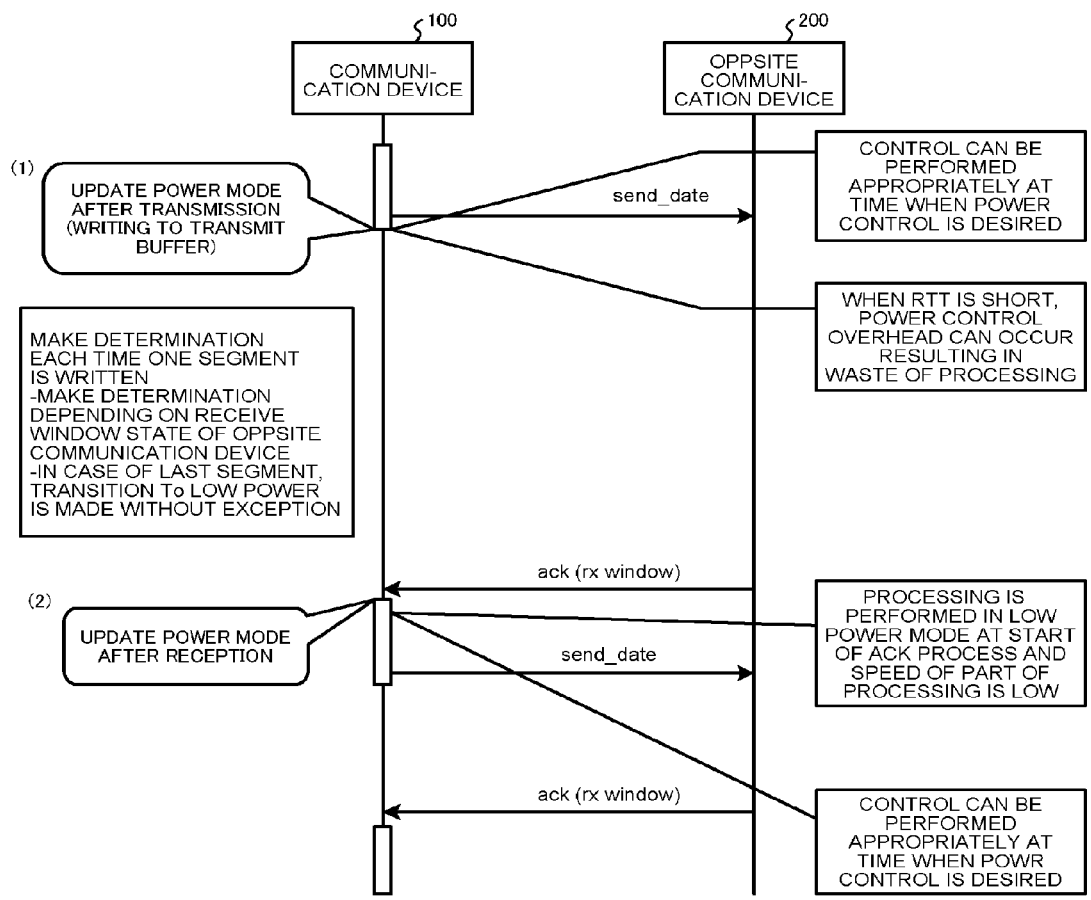
FIG. 1 is a diagram illustrating an overview of a communication process performed by a communication device to which a communication apparatus, a power control method, and a recording medium according to an aspect of the present invention are applied.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Exemplary embodiments according to the present invention are described below with reference to the accompanying drawings. Hereinafter, an example where a communication apparatus, a power control method, and a recording medium according to an aspect of the present invention are applied to a communication device used in TCP communication is described. However, application is not limited thereto, and the present invention is applicable to a variety of session-oriented communications.

An embodiment has an object to provide a communication apparatus capable of reducing power consumption in communication.

As described below, a communication device according to the present embodiment, when performing a power-consumption/clock control process, monitors a transmit and receive buffer of the communication device and a receive window of a communication partner, and controls a power mode on the basis of a value of the communication partner's receive window size.

FIG. 1 is a diagram illustrating an overview of a communication process performed by a communication device 100 to which a communication apparatus, a power control method, and a recording medium according to an aspect of the present invention are applied. Hardware and software, which will be described later, are mounted on the communication device 100 as in a typical computer.

As illustrated in FIG. 1, the communication device 100 changes a power mode at a time after transmitting a packet (send_data) divided in units of a segment to an opposite communication device 200 being a communication destination (1). The communication device 100 makes determination of a power-mode transition criterion on the basis of a value of a receive window size, which is reported in a packet (ack (rx window)) received from the opposite communication device 200, of the opposite communication device 200 (2).

As illustrated in FIG. 1, the communication device 100 determines a power mode on a segment-by-segment basis and, when a value of the receive window size is received from the opposite communication device 200, the communication device 100 determines the power mode on the basis of the value of the receive window size. Furthermore, when transmitting the last segment, the communication device 100 makes transition to a low power mode (Low Power) where power consumption is low without exception. Specific description about these processes will be given later.

Figure 2:
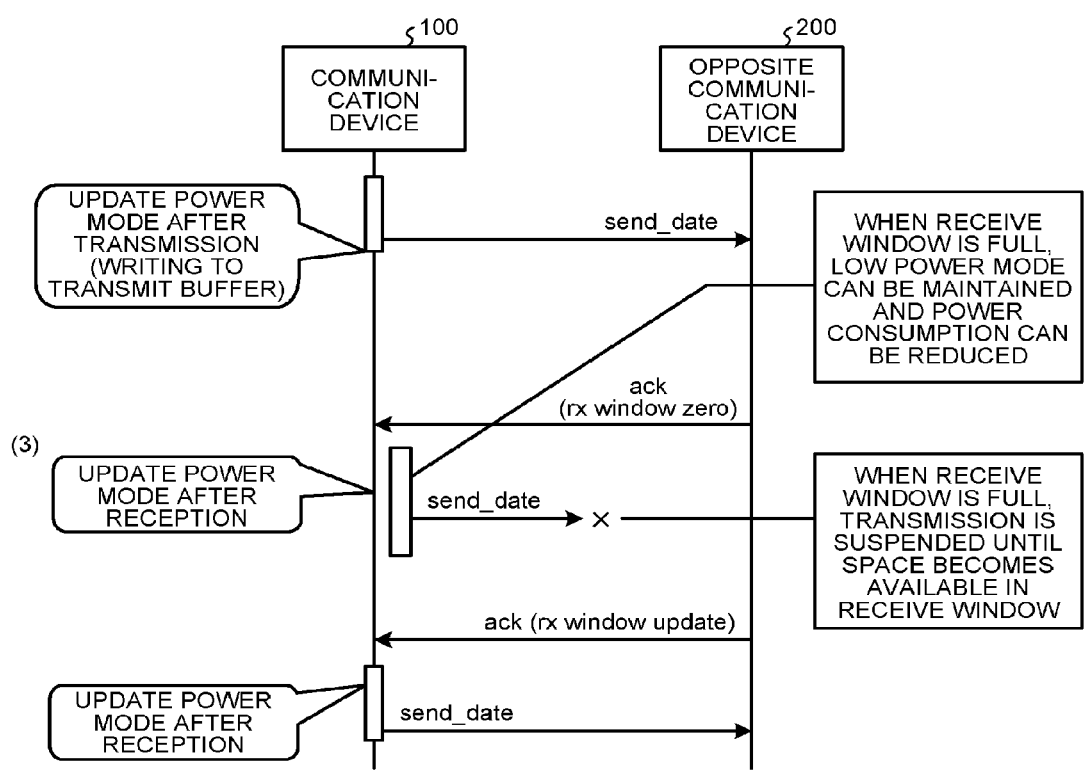
FIG. 2 is a diagram illustrating an overview of an advantage of the communication process performed by the communication device.

FIG. 2 is a diagram illustrating an overview of an advantage of the communication process performed by the communication device 100. In the conventional process, power mode transition is undesirably made in accordance with predicted time even when the opposite communication device 200 reports "Zero Window" (ack (rx window zero)) to the communication device 100 due to a delay in internal processing of the opposite communication device 200 or the like. By contrast, according to the method of the embodiment, because the communication device 100 determines a power mode and updates the power mode to a latest state when receiving the "Zero Window" (3), it is possible to maintain the low power mode.

Figure 3:
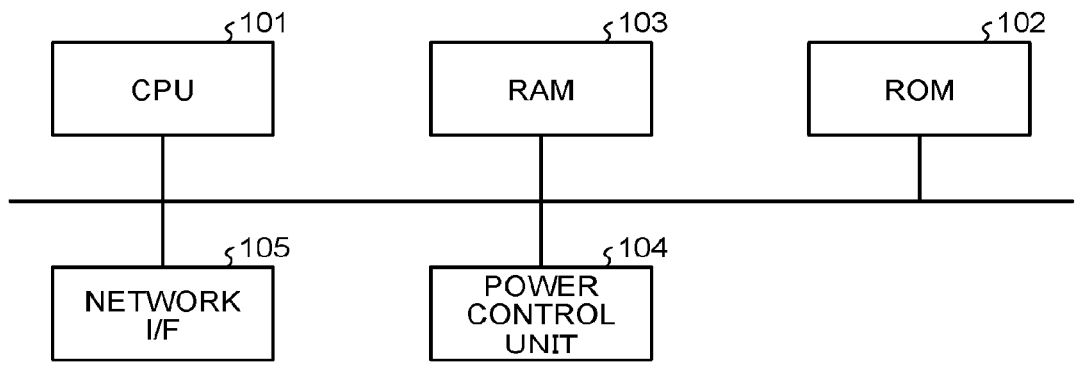
FIG. 3 is a diagram illustrating a hardware configuration of the communication device.

FIG. 3 is a diagram illustrating a hardware configuration of the communication device 100. As illustrated in FIG. 3, the communication device 100 includes a CPU (Central Processing Unit) 101 which is a computing device, a ROM (Read Only Memory) 102 which is a nonvolatile storage device, a RAM (Random Access Memory) 103 which is a rewritable memory device, a power control unit 104 which is a power control device, and a network I/F 105 which is a network interface device.

The CPU 101 executes a program stored in the ROM 102 or the ROM 102. The ROM 102 stores the above-described program and data necessary for the communication process performed by the communication device 100. The RAM 103 is used as an execution area of the above-described program. A region, such as a transmit and receive buffer of the communication device 100, necessary for the communication process is allocated in the RAM 103. The power control unit 104 controls clock supply to the CPU 101, a bus, and peripherals. The network I/F 105 transmits and receives a variety of information generated by an application.

Figure 4:
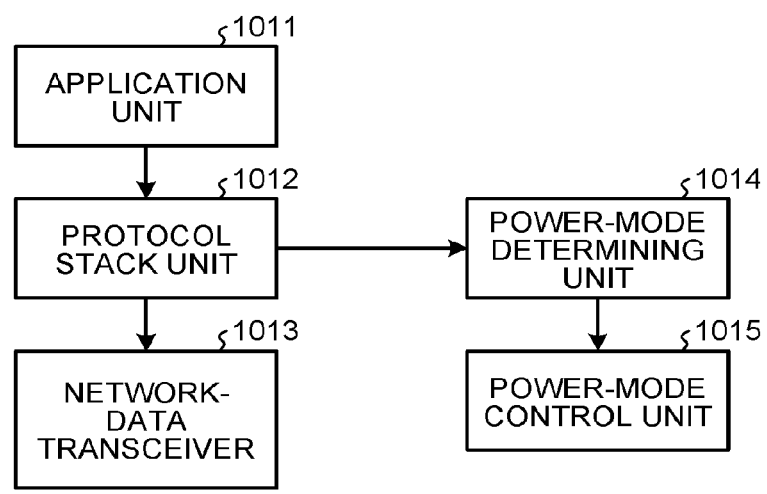
FIG. 4 is a diagram illustrating a software configuration of the communication device.

FIG. 4 is a diagram illustrating a software configuration of the communication device 100. As illustrated in FIG. 4, the communication device 100 functionally includes an application unit 1011, a protocol stack unit 1012, a network-data transceiver 1013, a power-mode determining unit 1014, and a power-mode control unit 1015.

The application unit 1011 executes an application requested by a user. For instance, the application unit 1011 may execute an authentication processing application for an external server and a sensor-information transmission application.

The protocol stack unit 1012 executes processing of transmitting and receiving a packet containing at least a part of data requested from the application unit 1011. The protocol stack unit 1012 holds and interprets TCP/IP-related information, performs a packet-generating and analyzing process, and divides the packet into segments in units of which communication is performed. Furthermore, the protocol stack unit 1012 requests the power-mode determining unit 1014 to change a power mode when transmitting a packet and receiving a packet. Examples of the TCP/IP-related information described above include a variety of information related to session communication, such as a TCP state, information about a TCP transmit and receive buffer, an RTT (Round-Trip Time), and a receive window size of the opposite communication device 200.

The network-data transceiver 1013 utilizes the network I/F 105 to forward the packet generated by the protocol stack unit 1012 to a network. Furthermore, the network-data transceiver 1013 notifies the protocol stack unit 1012 of a packet received by the network I/F 105.

Responsive to the request to change the power mode received from the protocol stack unit 1012, the power-mode determining unit 1014 makes a change determination as to whether or not to change the power mode and to which mode the power mode is to be changed. Furthermore, the power-mode determining unit 1014 instructs the power-mode control unit 1015 to change the power mode in accordance with a result of the change determination.

The power-mode control unit 1015 causes the power control unit 104 to change the power mode in accordance with the instruction received from the power-mode determining unit 1014.

In practice, the CPU 101 reads out programs installed in the ROM 102 and executing the programs to implement the functions provided by the application unit 1011, the protocol stack unit 1012, the network-data transceiver 1013, the power-mode determining unit 1014, and the power-mode control unit 1015.

These programs may be provided in a state of being installed in the ROM 102 in advance. Alternatively, the programs may be provided or delivered in a state of being recorded in a computer-readable recording medium, such as a CD-ROM, a CD-R, and a DVD (Digital Versatile Disk), as an installable file or an executable file. Further alternatively, the programs may be stored in a computer connected to a network, such as the Internet, and downloaded over the network to provide or deliver the programs.

Figure 5:
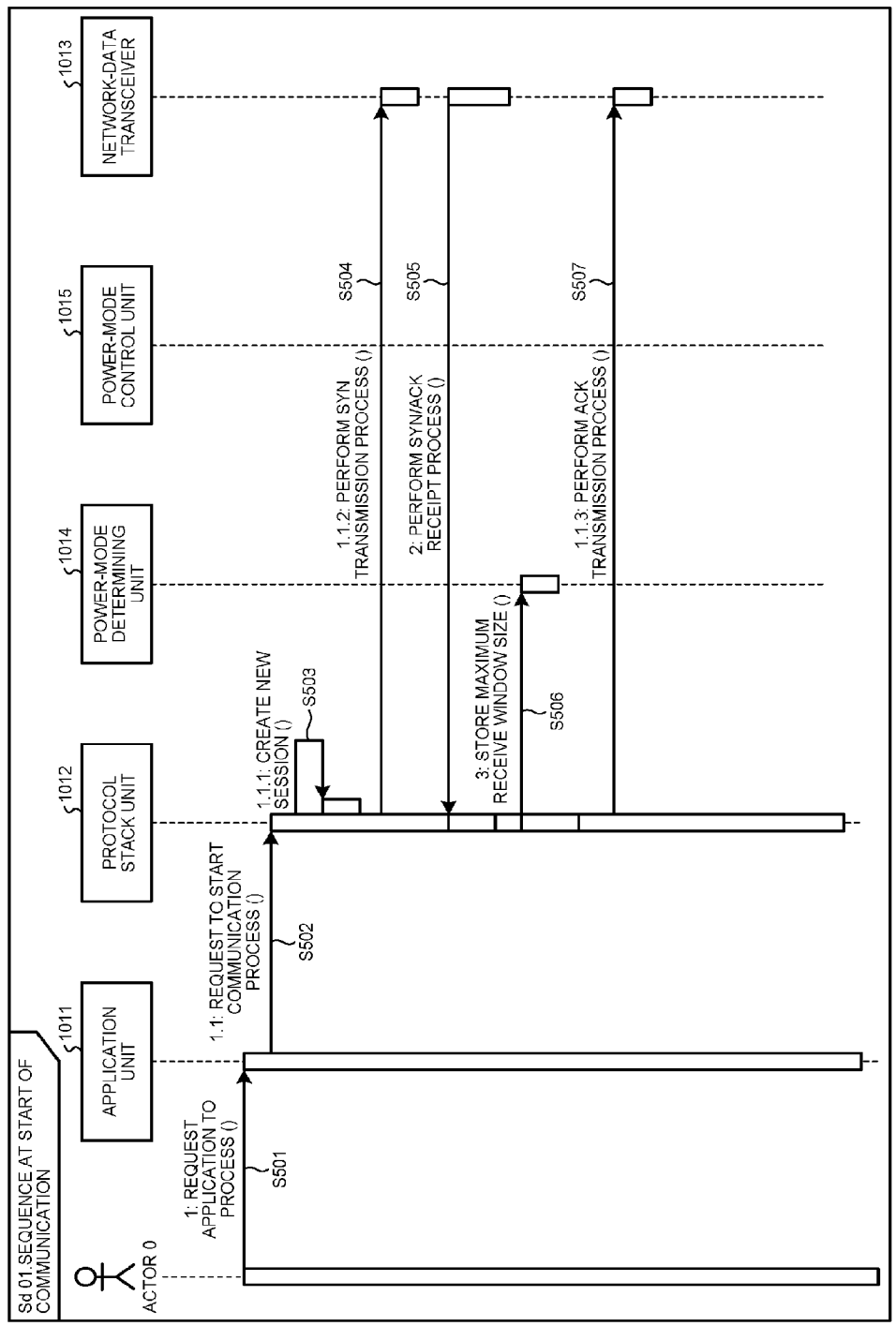
FIG. 5 is a sequence diagram at the start of communication by the communication device.

FIG. 5 is a sequence diagram (sd 01) at the start of communication by the communication device 100. As illustrated in FIG. 5, in the communication device 100, the application unit 1011 accepts an instruction to run an application from a user that is an actor (S501; 1: REQUEST APPLICATION TO PROCESS ( )). In accordance with the instruction, the application unit 1011 sends a request to start a communication process with the opposite communication device 200 to the protocol stack unit 1012 (S502; 1.1: REQUEST TO START COMMUNICATION PROCESS ( )).

The protocol stack unit 1012 creates a new session for performing communication with the opposite communication device 200 in accordance with the start request received from the application unit 1011 (S503; 1.1.1: CREATE NEW SESSION ( )). The protocol stack unit 1012 outputs a SYN packet to be sent to the opposite communication device 200 to the network-data transceiver 1013 (S504; 1.1.2: PERFORM SYN TRANSMISSION PROCESS ( )). Thereafter, the network-data transceiver 1013 transmits the SYN packet received from the protocol stack unit 1012 to the opposite communication device 200.

Upon receiving an ACK packet from the opposite communication device 200, the network-data transceiver 1013 outputs the ACK packet to the protocol stack unit 1012 (S505; 2: PERFORM SYN/ACK RECEIPT PROCESS ( )).

The protocol stack unit 1012 extracts, from the ACK packet received from the network-data transceiver 1013, a maximum value of a receive window size available by the opposite communication device 200 in the communication and stores the maximum value in the RAM 103 (S506; 3: STORE MAXIMUM RECEIVE WINDOW SIZE ( )). The receive window size is information necessary in determining a power mode at data transmission and receipt. The maximum value of the receive window size stored in the RAM 103 will be read out by the power-mode determining unit 1014. As will be described later, at completion of the communication session, the power-mode control unit 1015 makes power mode transition to the low power mode in accordance with a result of determination made by the power-mode determining unit 1014.

After storing the maximum value of the receive window size, the protocol stack unit 1012 outputs an ACK packet to the network-data transceiver 1013 (S507; 1.1.3: PERFORM ACK TRANSMISSION PROCESS ( )). Thereafter, the network-data transceiver 1013 transmits the ACK packet received from the protocol stack unit 1012 to the opposite communication device 200. At completion of S507, the sequence illustrated in FIG. 5 ends.

Figure 6:
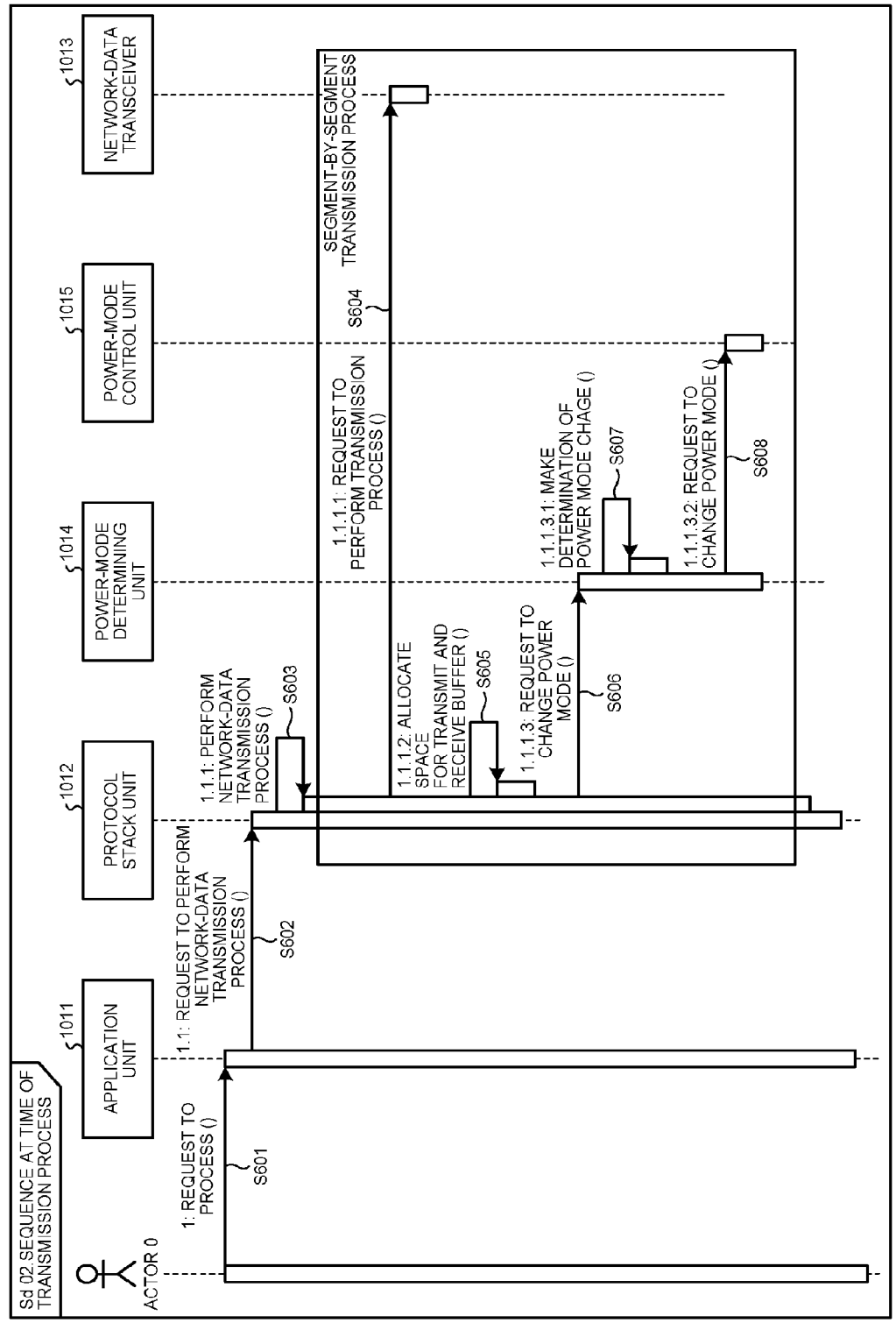
FIG. 6 is a sequence diagram at the time of data transmission by the communication device.

FIG. 6 is a sequence diagram (Sd 02) at the time of data transmission by the communication device 100. As described above, the communication device 100 determines a power mode to which transition is to be made, and makes transition to the determined power mode when transmitting data.

The application unit 1011 accepts an instruction to transmit data to be processed in an application from a user that is an actor (S601; 1: REQUEST TO PROCESS ( )). In accordance with the instruction, the application unit 1011 sends a request to perform a process of transmitting the data to the protocol stack unit 1012 (S602; 1.1: REQUEST TO PERFORM NETWORK-DATA TRANSMISSION PROCESS ( )).

Together with the request, the application unit 1011 passes session information about the opposite communication device 200 which is the destination of the data, and a size of the transmit and receive buffer and a size of the data, which are necessary for the communication device 100. There can be a case where the size of the data is larger than the size of one packet to be transmitted by the network-data transceiver 1013. Although an example where the transmission instruction is accepted from a user is described with reference to FIG. 6, the sequence may alternatively be performed by the application unit 1011 subsequent to completion of S507 illustrated in FIG. 5.

The protocol stack unit 1012 converts the data received from the application unit 1011 into a packet form used in TCP/IP and performs a transmission process for transmitting the converted packet to the opposite communication device 200 (S603; 1.1.1: PERFORM NETWORK-DATA TRANSMISSION PROCESS ( )). In this transmission process, processing from S604 to S608 is performed on a segment-by-segment basis.

Specifically, upon receiving the to-be-transmitted data from the application unit 1011, the protocol stack unit 1012 divides the data into segments to convert the data into the packet form described above. The protocol stack unit 1012 sends a request to perform a process of transmitting the packet divided in units of a segment to the network-data transceiver 1013 (S604; 1.1.1.1: REQUEST TO PERFORM TRANSMISSION PROCESS ( )).

Furthermore, the protocol stack unit 1012 allocates space for the transmit and receive buffer in the RAM 103 (S605; 1.1.1.2: ALLOCATE SPACE FOR TRANSMIT AND RECEIVE BUFFER ( )) and requests the power-mode determining unit 1014 to change a power mode. At this time, the protocol stack unit 1012 requests the power-mode determining unit 1014 to change a power mode differently depending on whether or not the packet to be transmitted contains the last segment (S606; 1.1.1.3: REQUEST TO CHANGE POWER MODE ( )).

Specifically, if it is determined that the packet to be transmitted does not contain the last segment, the protocol stack unit 1012 reports a value of the receive window size of the opposite communication device 200 stored in the RAM 103 at this point in time to the power-mode determining unit 1014 and sends a request to make a determination about power mode transition to the power-mode determining unit 1014. The process of receiving the value of the receive window size from the opposite communication device 200 will be described later with reference to FIG. 7.

On the other hand, if it is determined that the packet to be transmitted contains the last segment, the protocol stack unit 1012 sends a request to make power mode transition to the low power mode to the power-mode determining unit 1014 irrespective of the value of the receive window size of the opposite communication device 200. Definitive determination about the power mode is made by the power-mode determining unit 1014. The reason for this is to avoid an undesirable situation that the protocol stack unit 1012 is affected by processing for another application run in the communication device 100 or a plurality of sessions created in the communication device 100 and causes transition to an inappropriate power mode to occur.

The power-mode determining unit 1014 determines a power mode to which transition is to be made, using the value of the receive window size received from the opposite communication device 200, the maximum value of the receive window size stored at S506 of FIG. 5 at the start of the communication, and a power-mode determination table 1021 stored in the ROM 102 in advance (S607; 1.1.1.3.1: MAKE DETERMINATION OF POWER MODE CHANGE ( )). The value of the receive window size described above is the value stored in the RAM 103 at the point in time when S607 is performed.

The power-mode determining unit 1014 requests the power-mode control unit 1015 to control electric power in the determined power mode (S608; 1.1.1.3.2: REQUEST TO CHANGE POWER MODE ( )). Thereafter, the power-mode control unit 1015 controls power of the communication device 100 in the power mode requested by the power-mode determining unit 1014.

FIG. 7 is a diagram illustrating an example of the power-mode determination table 1021. The power-mode determination table 1021 is a table for use by the power-mode determining unit 1014 in determining a power mode to which transition is to be made. As illustrated in FIG. 7, determination criteria and power modes are stored in the power-mode determination table 1021 in association with each other. As the determination criteria, levels (small: Rx Empty, middle: Rx Mid, and large: Rx Full) of the value of the receive window size that can be received from the opposite communication device 200 are defined. As the power modes, power levels (high: High Power, middle: Mid Power, and low: Low Power) to which the communication device 100 can make transition, are defined. In this example, when the value of the receive window size received from the opposite communication device 200 is "small", power mode transition to "high" is made. Specifically, it is indicated that when the value of the receive window size is small, because large space is available in the transmit and receive buffer of the opposite communication device 200, transition of the communication device 100 to a high power mode is made.

In the above-described example, power mode transition is made between the three levels. As a method for determining the power mode, the following method can be employed.

For example, the power-mode determining unit 1014 can compare the reported value of the receive window size of the opposite communication device 200 with the maximum value of the receive window size stored at S506 of FIG. 5 and determine the power mode depending on a ratio between the reported value and the maximum value. Specifically, the power-mode determining unit 1014 determines that the determination criterion "small" (Rx Empty) is met when the value of the receive window size is smaller than one-third of the maximum value of the receive window size (0<(the reported value of the receive window size)<(the maximum value of the receive window size)/3).

The power-mode determining unit 1014 determines that the determination criterion "medium" (Rx Mid) is met when the value of the receive window size is equal to or larger than one-third of the maximum value of the receive window size and smaller than two-thirds of the same ((the maximum value of the receive window size)/3≤(the reported value of the receive window size)<(the maximum value of the receive window size)*2/3).

The power-mode determining unit 1014 determines that the determination criterion "large" (Rx Full) is met when the value of the receive window size is equal to or larger than two-thirds of the maximum value of the receive window size and smaller than the maximum value ((the maximum value of the receive window size)*2/3≤(the reported value of the receive window size)<(the maximum value of the receive window size)).

In the above-described example, the power mode to be controlled makes transition between the three levels: "High Power", "Mid Power", and "Low Power". The levels corresponding to the clock frequency of the CPU 101, and for example, changing to "High Power" corresponds to changing the clock frequency to 400 MHz, changing to "Mid Power" corresponds to changing the clock frequency to 100 MHz, and changing to "Low Power" corresponds to changing the clock frequency to 50 MHz. Alternatively, a bus frequency, a frequency(ies) of a peripheral(s), and the like may be combined to define or change power modes.

In this way, the communication device 100 changes the power mode when the segment-by-segment transmission process is completed using a value, which is stored in the RAM 103 at the point in time of the completion, of the receive window size. Accordingly, the communication device 100 can prevent an undesirable situation that the segment-by-segment transmission process is performed at an excessive speed as compared with communication processing capacity of the opposite communication device 200, thereby making it possible to perform the transmission process with lower power consumption. Furthermore, the communication device 100 makes transition to the low power consumption mode without exception when transmitting the last segment. Accordingly, an undesirable situation that the communication device 100 operates in the high power mode even though there is no processing to be performed in a period waiting for a response from the opposite communication device 200 can be avoided, and the transmission process can be performed with still lower power consumption.

Figure 8:
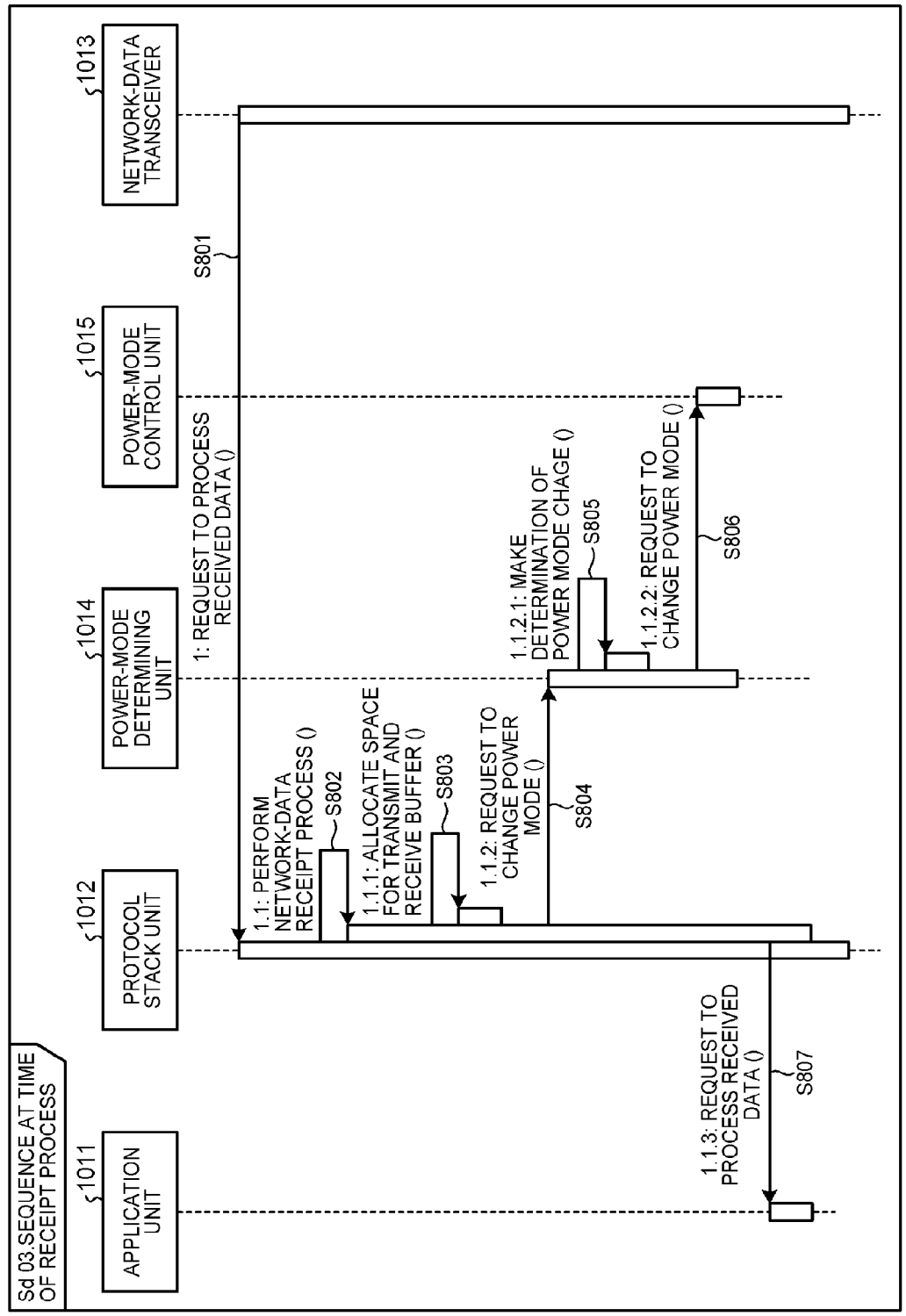
FIG. 8 is a sequence diagram at the time of data reception by the communication device.

FIG. 8 is a sequence diagram (Sd 03) at the time of data reception by the communication device 100. As described above, the communication device 100 makes determination about power mode transition and makes power mode transition also when receiving data.

The network-data transceiver 1013 detects a packet received from the opposite communication device 200 and sends the packet to the protocol stack unit 1012 (S801; 1: REQUEST TO PROCESS RECEIVED DATA ( )).

The protocol stack unit 1012 performs a receipt process for converting the packet received from the network-data transceiver 1013 into a form for use in the application unit 1011 (S802; 1.1: PERFORM NETWORK-DATA RECEIPT PROCESS ( )).

Furthermore, the protocol stack unit 1012 allocates space for the transmit and receive buffer in the RAM 103 and stores a value of the receive window size received together with the packet at S801 in the RAM 103 (S803; 1.1.1:

ALLOCATE SPACE FOR TRANSMIT AND RECEIVE BUFFER ( )). Thereafter, the protocol stack unit 1012 requests the power-mode determining unit 1014 to change a power mode (S804; 1.1.2: REQUEST TO CHANGE POWER MODE ( )).

The power-mode determining unit 1014 determines a power mode to which transition is to be made, using the value of the receive window size stored at S803, the maximum value of the receive window size stored at S506 of FIG. 5 at the start of the communication, and the power-mode determination table 1021 (S805; 1.1.2.1: MAKE DETERMINATION OF POWER MODE CHANGE ( )).

The power-mode determining unit 1014 requests the power-mode control unit 1015 to control power in the determined power mode (S806; 1.1.2.2: REQUEST TO CHANGE POWER MODE ( )). Thereafter, the power-mode control unit 1015 controls power of the communication device 100 in the power mode requested by the power-mode determining unit 1014.

The protocol stack unit 1012 converts the packet divided in units of a segment and received from the network-data transceiver 1013 into a form for use in the application and passes the converted packet to the application unit 1011 (S807; 1.1.3: REQUEST TO PROCESS RECEIVED DATA ( )).

Hence, when, for example, "Zero Window" is reported from the opposite communication device 200 at S801, power transition to the low power mode can be made at a time after being reported. Therefore, communication can be performed with still lower power consumption.

As described above, according to the present embodiment, because power mode switching is done depending on the value (i.e., occupancy rate) of the receive window of the opposite communication device 200, with which communication is performed, power consumption in session-oriented communications, such as TCP communication, can be reduced efficiently.

The communication device 100 can be implemented by combining the embodiment described above and modifications described below as appropriate to achieve more appropriate power control.

For example, it is possible to add items indicating states of the transmit and receive buffer of the communication device 100 to the power-mode determination table 1021.

Figure 9:
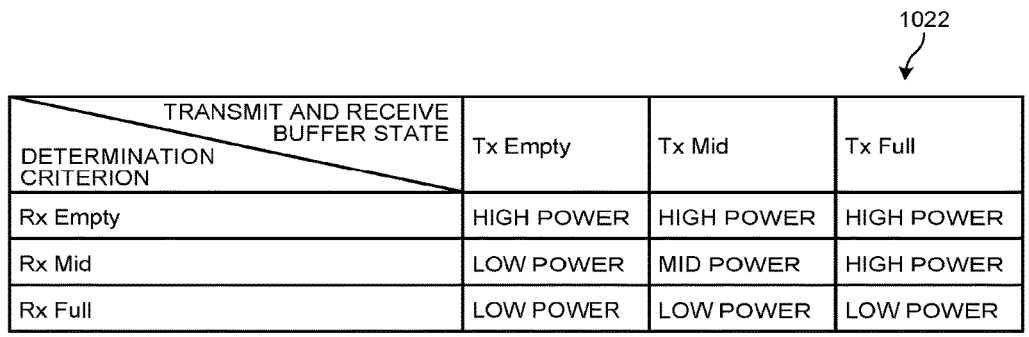
FIG. 9 is a diagram illustrating an example of a power-mode determination table to which items indicating vacancy states of a transmit and receive buffer allocated in a RAM, are added.

FIG. 9 is a diagram illustrating an example of a power-mode determination table 1022 created by adding items indicating vacancy states of the transmit and receive buffer allocated in the RAM 103 to the power-mode determination table 1021. Although information pieces stored in the power-mode determination table 1021 are not presented in FIG. 9, in an actual form, the power-mode determination table 1021 and the power-mode determination table 1022 are stored in association with each other.

As illustrated in FIG. 9, the determination criteria and the states of the transmit and receive buffer are stored in the power-mode determination table 1022 in association with each other. In FIG. 9, as in the case illustrated in FIG. 7, levels of the value of the receive window size received from the opposite communication device 200 are defined as the determination criteria. Furthermore, sizes (small: Tx Empty, middle: Tx Mid, and large: Tx Full) of occupied space are defined as the states of the transmit and receive buffer of the communication device 100.

As in the case illustrated in FIG. 7, when transmitting data and receiving data, the power-mode determining unit 1014 calculates a ratio between allocated space for the transmit and receive buffer and occupied space in the transmit and receive buffer and determines the power mode on the basis of the ratio using this table.

For example, when it is determined that the value of the receive window size received from the opposite communication device 200 is "medium" (i.e., the determination criterion "medium" is met), the power-mode determining unit 1014 further checks the state of the transmit and receive buffer of the communication device 100. The power-mode determining unit 1014 refers to the power-mode determination table 102, and when the power-mode determining unit 1014 determines that the transmit and receive buffer of the communication device 100 is not used and has enough available space (i.e., the state of the transmit and receive buffer is "small: Tx Empty"), the power-mode determining unit 1014 determines that transmission processing capacity of the communication device 100 is higher than the opposite communication device 200 and makes power mode transition to "Low Power". In FIG. 7, when the power-mode determining unit 1014 determines that the determination criterion "middle" is met, power mode transition to "Mid Power" is made. By contrast, with this configuration, because power mode transition to "Low Power" is made, further reduction in power consumption of the communication device 100 can be obtained. Put another way, power mode transition to more appropriate power mode depending on communication traffic volume can be made, and reduction in power consumption can be achieved.

In the present example, the ratio with respect to the occupied space in the transmit and receive buffer is used. Alternatively, a ratio with respect to a vacant space in the transmit and receive buffer may be calculated. When a transmit buffer and a receive buffer are separated, a ratio between an allocated transmit buffer or an allocated receive buffer and an occupied space in the transmit buffer or an occupied space in the receive buffer may alternatively be calculated.

The above-described scheme allows relative comparison of capacity between the opposite communication device 200 and the communication device 100, thereby making it possible to perform communication in a manner adapted to the capacity of the opposite communication device 200 with low power consumption.

As another modification, another determination criterion for power mode determination than the ratio between the value of the receive window size received from the opposite communication device 200 and the maximum value of the receive window size can be used.

For example, when the maximum value of the receive window size received from the opposite communication device 200 is small, the range of each determination criterion (i.e., range of each of "Rx Empty", "Rx Mid", and "Rx Full") is narrow. As a result, an undesirable situation that little or less power saving effect is obtained can be caused by an increase in the number of power mode transitions.

Therefore, the power-mode determining unit 1014 may be configured to determine the power mode on the basis of a threshold value of the receive window size received from the opposite communication device 200. The threshold value is a value for use by the power-mode determining unit 1014 in determining a width of a range of the determination criterion. The threshold value may be stored in the ROM 102 of the communication device 100 in advance as a setting value or, alternatively, may be externally set via a predetermined interface by a user, an administrator, or the like for each application unit 1011 that performs communication. In the latter case, the user, administrator, or the like can set a desired threshold value. The threshold value may be set as follows, for example.

(Fixed Threshold Value Based on Literal Value)

A threshold value between "Rx Empty" and "Rx Mid" is set to 8 Kbytes; a threshold value between "Rx Mid" and "Rx Full" is set to 16 Kbytes.

(Threshold Value Specified Using MSS (Maximum Segment Size) Determined at the Start of Communication)

The threshold value between "Rx Empty" and "Rx Mid" is set to 4*MSS; the threshold value between "Rx Mid" and "Rx Full" is set to 8*MSS. The MSS is a value matched between the communication device 100 and the opposite communication device 200 at the start of communication and is a largest amount of data that can be transmitted in a single packet.

(Threshold Value Based on Transmit and Receive Buffer of Communication Device)

The threshold value between "Rx Empty" and "Rx Mid" is set to 1/3*TxBuffer; the threshold value between "Rx Mid" and "Rx Full" is set to 2/3*TxBuffer.

These schemes allow maintaining the power consumption mode of the communication device 100 appropriately even when there is a difference between communication capability or the size of the transmit and receive buffer of the communication device 100 and the value of the receive window size of the opposite communication device 200 and communication capacities of the communication device 100 and the opposite communication device 200 are out of balance.

As still another modification, a result of measuring the RTT can be used as a determination criterion for determining the power mode in the transmission process.

In the configuration presented above, as described at S606 of FIG. 6, transition to the low power mode is made after a series of the transmission process is completed with transmission of the last segment packet. However, in communication based on OnLink or Ethernet (registered trademark) communication standard, the RTT is small. In this case, if the communication device 100 changes the power mode each time, overhead can occur and power can be wasted unnecessarily. Therefore, the power-mode determining unit 1014 is preferably configured not to change the power mode when the RTT is equal to or lower than a threshold value of the RTT.

Specifically, the threshold value of the RTT is stored in the ROM 102 in advance. RTT measurement is started when S604 of FIG. 6 is performed by the protocol stack unit 1012. The protocol stack unit 1012 reads out the threshold value of the RTT that is stored in advance and, upon performing S606, passes the read-out value to the power-mode determining unit 1014. The protocol stack unit 1012 stops the RTT measurement when S801 of FIG. 8 has been performed and a response from the opposite communication device 200 is received. In practice, the protocol stack unit 1012 monitors a timer (not illustrated) to measure the RTT.

The power-mode determining unit 1014 determines, for example, whether or not the measured value of the RTT meets the threshold value of the RTT. If the measured value of the RTT does not exceed the threshold value of the RTT, the power-mode determining unit 1014 maintains the current power mode without making power mode transition to "Mid Power" even when the determination criterion "middle" is met.

With this scheme, because the power mode is not changed when communication response time is shorter than time specified by the threshold value, processing overhead incurred by power mode change can be reduced.

As still another modification, the determination criterion for the power mode may be constructed so as to lock the power mode from the side of the application.

According to the configuration described above, the communication device 100 performing communication with the opposite communication device 200 makes power mode transition to the high power mode to perform high-speed communication whenever the value of the receive window size of the opposite communication device 200 is small and therefore the opposite communication device 200 has enough available space, but makes transition to the low power mode when the opposite communication device 200 does not have enough available space. However, some type of application does not require high-speed communication and is desirably operated in the low power mode continuously even if the opposite communication device 200 has enough available space. Examples of such application include an application that transmits logs at regular time intervals.

For such applications, as will be described below, the mode where the power mode is desired to be locked (hereinafter, "power mode to be locked") may be stored in the ROM 102 of the communication device 100 as a setting value in advance or, alternatively, may be externally specified by a user, an administrator, or the like via a predetermined interface for each application unit 1011 that performs communication.

(Processing at the Start of Communication)

Figure 10:
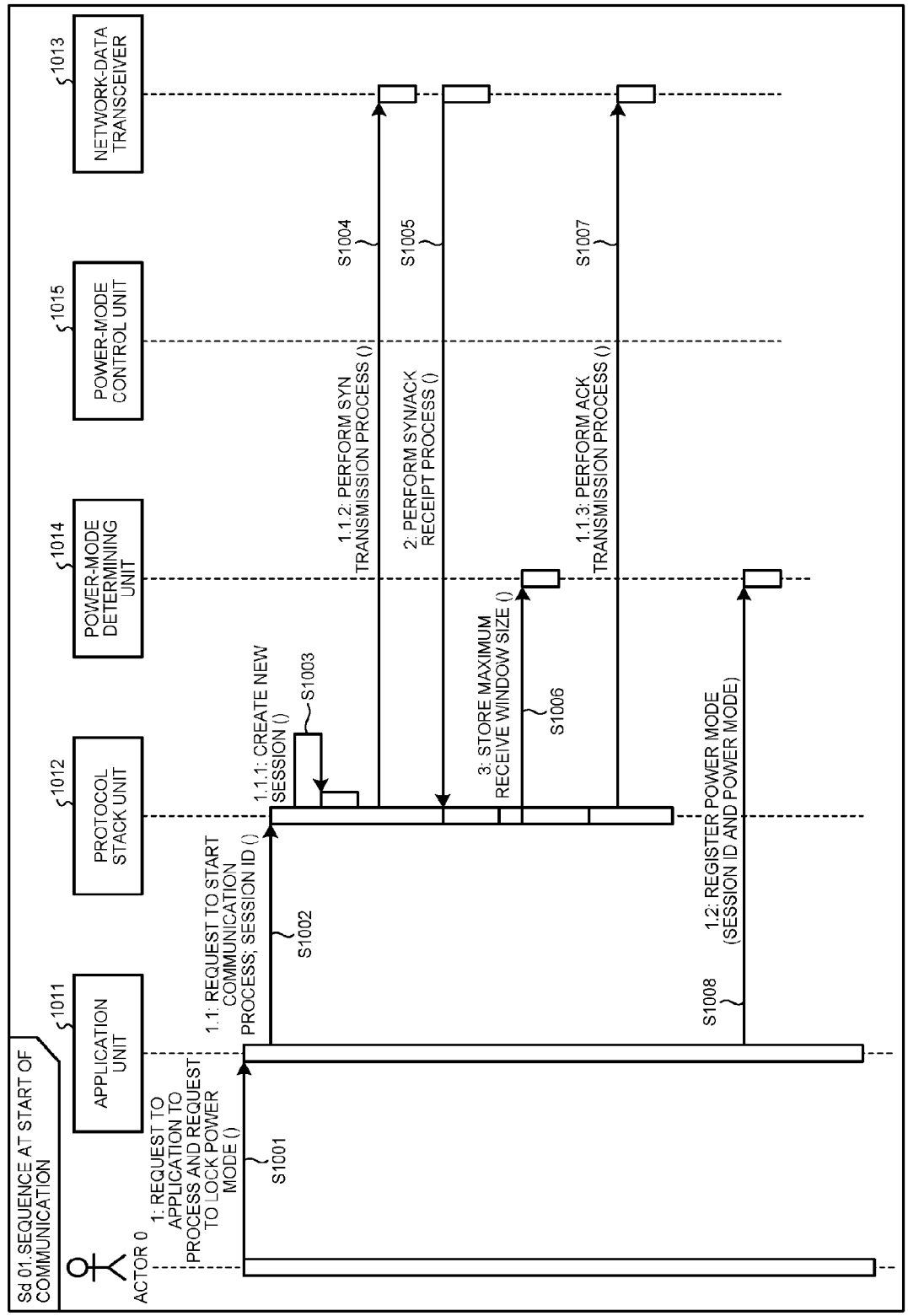
FIG. 10 is a sequence diagram in a case where a power mode is designated at the start of communication.

FIG. 10 is a sequence diagram (Sd 01) in a case where the power mode is designated at the start of communication. As illustrated in FIG. 10, as in the case illustrated in FIG. 5, the application unit 1011 accepts an instruction to run an application and an instruction to lock the power mode in a desired power mode from a user that is an actor (S1001; 1: REQUEST TO APPLICATION TO PROCESS AND REQUEST TO LOCK POWER MODE ( )).

As at S502 of FIG. 5, the application unit 1011 sends a request to start a communication process with the opposite communication device 200 to the protocol stack unit 1012 and acquires a session ID from the protocol stack unit 1012 (S1002; 1.1: REQUEST TO START COMMUNICATION PROCESS; SESSION ID ( )).

As at S503 of FIG. 5, the protocol stack unit 1012 creates a new session (S1003; 1.1.1: CREATE NEW SESSION ( )), and outputs a SYN packet to be sent to the opposite communication device 200 to the network-data transceiver 1013 (S1004; 1.1.2: PERFORM SYN TRANSMISSION PROCESS ( )).

As at S505 of FIG. 5, the network-data transceiver 1013 receives an ACK packet from the opposite communication device 200 and outputs the ACK packet to the protocol stack unit 1012 (S1005; 2: PERFORM SYN/ACK RECEIPT PROCESS ( )).

As at S506 and S507 of FIG. 5, the protocol stack unit 1012 extracts, from the ACK packet received from the network-data transceiver 1013, a maximum value of the receive window size available by the opposite communication device 200 in the communication, stores the maximum value in the RAM 103 (S1006; 3: STORE MAXIMUM RECEIVE WINDOW SIZE ( )), and outputs an ACK packet to the network-data transceiver 1013 (S1007; 1.1.3: PERFORM ACK TRANSMISSION PROCESS ( )).

The application unit 1011 reports the session ID acquired at S1002 and the power mode to be locked to the power-mode determining unit 1014 (S1008; 1.2: REGISTER POWER MODE (SESSION ID AND POWER MODE)). Thereafter, the power-mode determining unit 1014 identifies the power mode to be locked reported from the application unit 1011 in the power-mode determination table 1021 stored in the ROM 102, stores the identified power mode and the session ID in the RAM 103 in association with each other.

(Processing at Data Transmission)

At S606 illustrated in FIG. 6, the protocol stack unit 1012 requests the power-mode determining unit 1014 to change the power mode and reports the session ID stored in the RAM 103 to the power-mode determining unit 1014. Thereafter, the power-mode determining unit 1014 determines the power mode through the procedure described below with reference to a flowchart.

Figure 11:
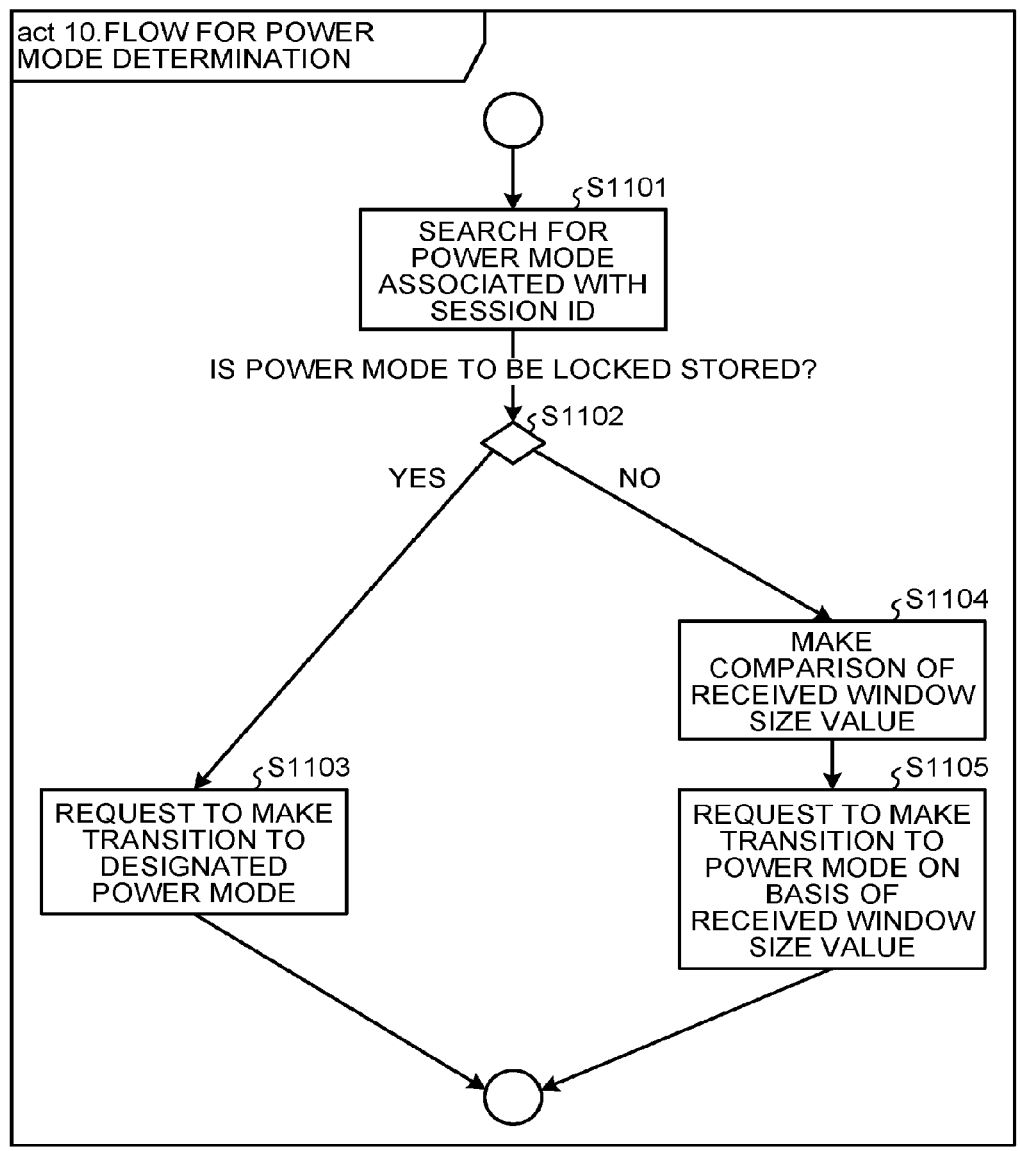
FIG. 11 is a flowchart illustrating a procedure for a power-mode determination process to be performed at S607.
Figure 12:
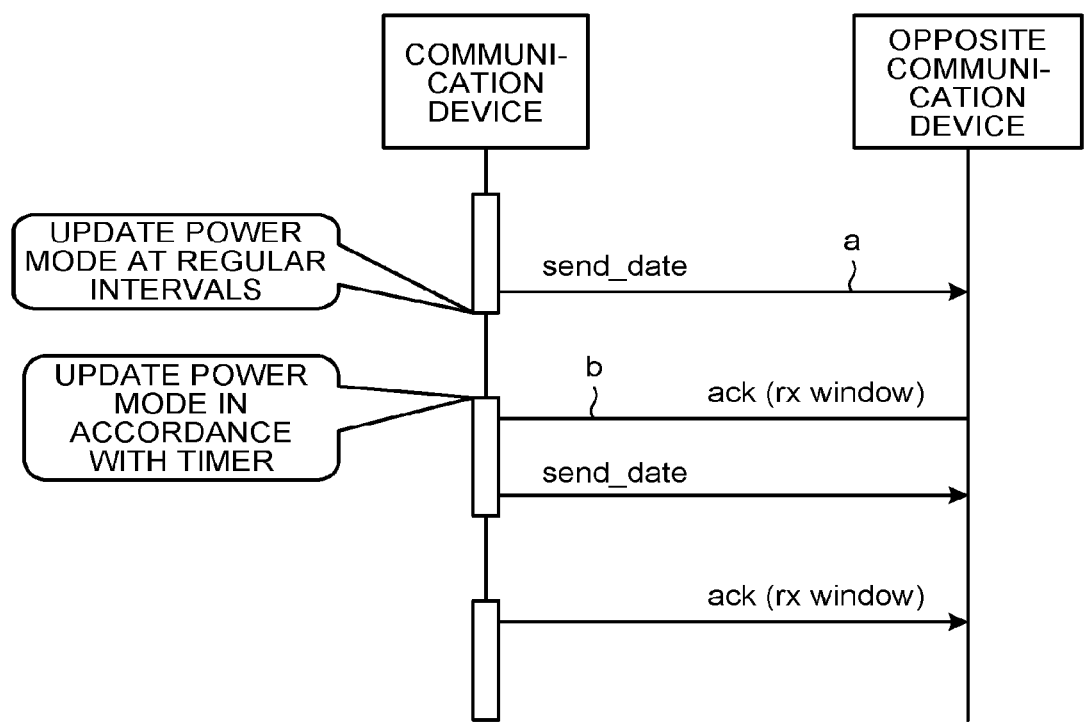
FIG. 12 is a diagram illustrating an example of a conventional technique.
Figure 13:
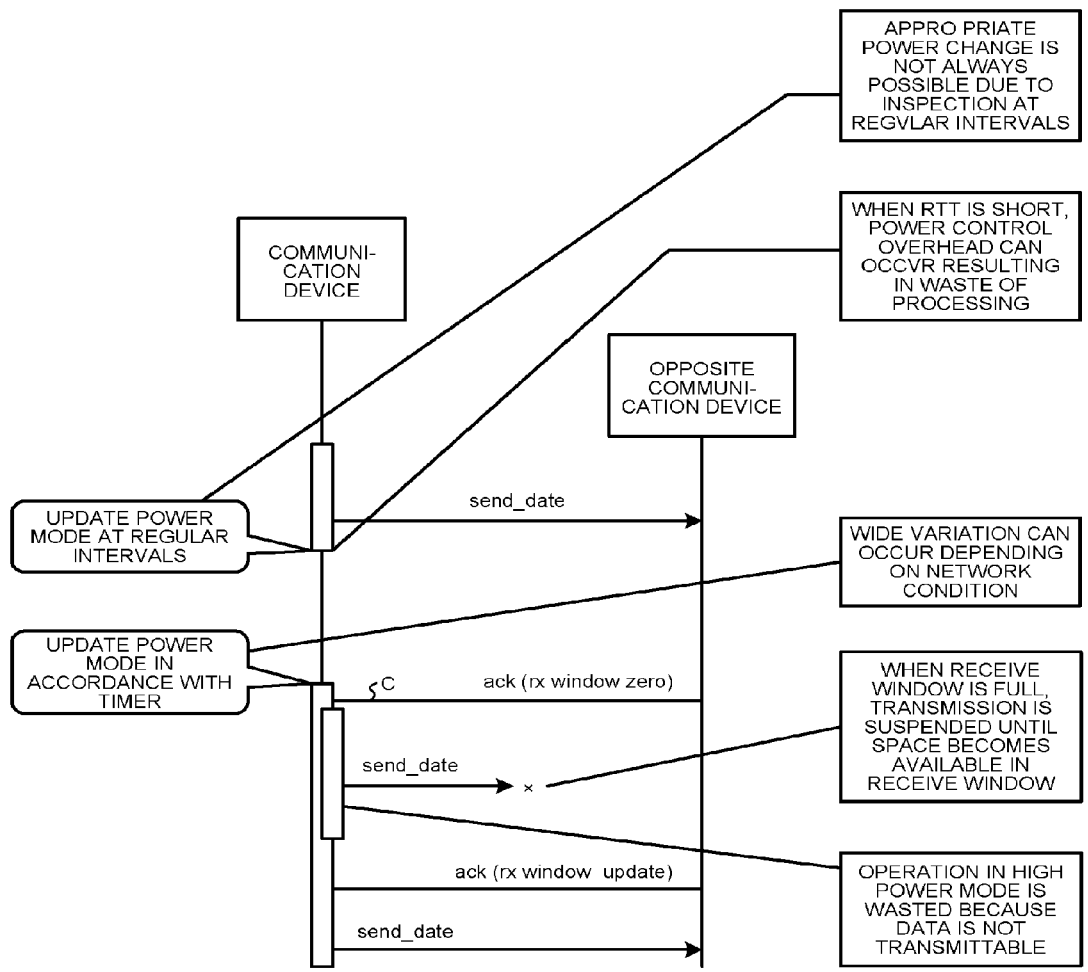
FIG. 13 is a diagram illustrating an example of a problem with the conventional technique.

FIG. 11 is the flowchart (act 10) illustrating the procedure for the power-mode determination process to be performed at S607.

As illustrated in FIG. 11, at S607, the power-mode determining unit 1014 queries the power-mode determination table 1021 using the reported session ID as a search key first (S1101) to determine whether or not the power mode to be locked associated with the session ID is stored in the RAM 103 (S1102).

If the power-mode determining unit 1014 determines that the power mode to be locked associated with the session ID is stored in the RAM 103 (Yes at S1102), the power-mode determining unit 1014 requests the power-mode control unit 1015 to change to the power mode to be locked (S1103). The power-mode control unit 1015 changes the power mode in accordance with the request.

On the other hand, if the power-mode determining unit 1014 determines that the power mode to be locked associated with the session ID is not stored in the RAM 103 (No at S1102), as illustrated in FIG. 6, the power-mode determining unit 1014 refers to the value of the receive window size received from the opposite communication device 200, the maximum value of the receive window size stored at S506 of FIG. 5 at the start of the communication, and the power-mode determination table stored in the ROM 102 in advance (S1104), and determines a power mode to which transition is to be made (S1105). The power-mode control unit 1015 changes the power mode in accordance with the determination.

As another modification, the power-mode determining unit 1014 may determine the power mode using results of determination made for a plurality of sessions.

When a plurality of sessions are created concurrently, which can occur in a situation where, for example, the communication device 100 performs communications with a plurality of the opposite communication devices 200, the power-mode determining unit 1014 makes power mode determination for each of the opposite communication devices 200 and thus the number of power mode transitions becomes large. As a result, the communication device 100 can fail to operate in an expected power mode.

For example, assume a situation where the number of the opposite communication devices 200 is two (hereinafter, "the first opposite communication device 200 and the second opposite communication device 200") and a value of the receive window size received from the first opposite communication device 200 is "Rx Full" and a value of the receive window size received from the second opposite communication device 200 is "Rx Empty". In this situation, if the power-mode determining unit 1014 causes the power mode determined last to make transition to the low power mode on the basis of information about the first opposite communication device 200, the communication device 100 undesirably performs low-speed communication even though there is processing necessary to perform communication with the second opposite communication device 200. To prevent this inconvenience, the communication device 100 is preferably configured to store the power-mode determination table 1021 illustrated in FIG. 7 for each of sessions created between the respective opposite communication devices 200 and the communication device 100. This configuration allows the power-mode determining unit 1014 to determine a power mode without being affected by the value of the receive window size of the other opposite communication device 200. Accordingly, undesirable transition to an unexpected power mode can be avoided, and power can be controlled more efficiently when performing communications with a plurality of communication partners.

When the number of the opposite communication devices 200 is two or more as in the above-described situation, sessions between the communication device 100 and the respective opposite communication devices 200 can include a session, in which the value of the receive window size received from the first opposite communication device 200 is "Rx Empty" but a priority level of the session is low. In such a case, power control can be performed in a more expected manner if the power-mode determining unit 1014 determines the power mode as follows. The power-mode determining unit 1014 assigns a priority level to each of the sessions between the communication device 100 and the opposite communication devices 200 and adopts a power mode with a higher priority level as the power mode.

How the power-mode determining unit 1014 determines a power mode in a situation where, for example, the priority level of a session created between the communication device 100 and the first opposite communication device 200 is higher than the priority level of a session created between the communication device 100 and the second opposite communication device 200 is described below. Even if, after the power-mode determining unit 1014 once determines to make transition to the low power mode on the basis of information about the first opposite communication device 200, information about the second opposite communication device 200 suggests that transition to the high power mode be made, because the priority level of the session with the first opposite communication device 200 is higher, the power-mode determining unit 1014 determines to make transition to the low power mode.

This scheme allows efficient power control while taking priority levels of sessions into consideration when communications are performed with a plurality of communication partners.

Still another modification can be configured as follows. When the functions described above are implemented by the protocol stack unit 1012 implemented in hardware in the form of, for example, an IC (Integrated Circuit) chip, processing cannot be controlled as in the case where the functions are implemented in software. Accordingly, transmission or reception by TCP is undesirably automatically performed after the protocol stack unit 1012 has allocated space for the transmit and receive buffer at S605 of FIG. 6 or at S803 of FIG. 8. As a result, there can arise a case where, for example, the communication device 100 cannot perform S804 and the following steps of FIG. 8 upon receiving a packet from the opposite communication device 200.

This problem can be solved by the protocol stack unit 1012 implemented in hardware causing an interruption upon receiving a response packet from the opposite communication device 200. However, this solution involves operation of the CPU 101 and impairs performance improvement and power saving provided by the automated response, and can result in losing advantages provided by implementation in hardware.

In view of the circumstances, in this modification, the protocol stack unit 1012 implemented in hardware outputs an interrupt signal upon detecting a change in the receive window size received from the opposite communication device 200. The power-mode determining unit 1014 determines whether or not the protocol stack unit 1012 implemented in hardware has output an interrupt signal and determines a power mode to which transition is to be made, only when the interrupt signal is output from the protocol stack unit 1012.

Thus, only when the protocol stack unit 1012 implemented in hardware detects a change in the receive window size, an interruption is caused so that the power-mode determining unit 1014 determines a power mode. Accordingly, as long as a change in the receive window size is not detected, an interruption will not be caused and the power-mode determining unit 1014 does not determine a power mode. Hence, a communication process achieving more power saving can be provided.

According to an embodiment, a communication apparatus capable of reducing power consumption in communication can be provided.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A communication apparatus, comprising:
   a transceiver configured to receive, from at least one destination apparatus,
   a receive window size for use in communication with the at least one destination apparatus;
   processing circuitry configured to determine a power mode to which transition is to be made, based on the received window size; and
   protocol stack circuitry configured to request the processing circuitry to determine the power mode at a time after transmitting and receiving data from the at least one destination apparatus, wherein the processing circuitry is further configured to control electric power in accordance with the determined power mode,
   the protocol stack circuitry is further configured to measure an RTT (Round-Trip Time) between the communication apparatus and the at least one destination apparatus, and
   the processing circuitry is further configured to determine whether or not a measured value of the RTT is less than a threshold value of the RTT, and when determining that the measured value of the RTT is not less than the threshold value of the RTT, not making a power node transition.

2. The communication apparatus according to claim 1, wherein the processing circuitry is further configured to determine the power mode to which transition is to be made, based on any one of an occupancy state and a vacancy state of a buffer of the communication apparatus.

3. The communication apparatus according to claim 1, wherein the processing circuitry is further configured to determine the power mode to which transition is to be made, based on a threshold value of the receive window size, the threshold value being stored in the communication apparatus in advance or being specified.

4. The communication apparatus according to claim 3, wherein the processing circuitry is further configured to determine the power mode to which transition is to be made, based on the threshold value set by a predetermined application in accordance with a user's specification.

5. The communication apparatus according to claim 1, wherein
   the at least one destination apparatus includes a plurality of destination apparatuses,
   the communication apparatus performs communications with the plurality of destination apparatuses, and
   the processing circuitry is further configured to determine the power mode to which transition is to be made, for each session created for communications between the communication apparatus and the plurality of destination apparatuses.

6. The communication apparatus according to claim 5, wherein the processing circuitry is further configured to determine the power mode to which transition is to be made, based on priority levels assigned for the respective sessions.

7. A communication apparatus, comprising:
a transceiver configured to receive, from at least one destination apparatus, a receive window size for use in communication with the at least one destination apparatus;
processing circuitry configured to determine a power mode to which transition is to be made, based on the received receive window size; and
protocol stack circuitry configured to request the processing circuitry to determine the power mode at a time after transmitting and receiving data to and from the at least one destination apparatus, wherein
the processing circuitry is further configured to control electric power in accordance with the determined power mode,
the protocol stack circuitry is further configured to output an interrupt signal in response to detecting a change in the receive window size, and
the processing circuitry is further configured to determine whether or not the protocol stack circuitry has output the interrupt signal and determine the power mode to which transition is to be made, when the processing circuitry determines that the interrupt signal is output.

8. A power control method, comprising:
receiving, from at least one destination apparatus, a receive window size for use in communication by a communication apparatus with the at least one destination apparatus;
determining a power mode to which transition is to be made, based on the received receive window size;
requesting to perform the determining at a time after transmitting and receiving data to and from the at least one destination apparatus; and
controlling electric power in accordance with the determined power mode, the method further comprising measuring an RTT (Round-Trip Time) between the communication apparatus and the at least one destination apparatus, and determining whether or not a measured value of the RTT is less than a threshold value of the RTT, and when determining that the measured value of the RTT is not less than the threshold value of the RTT, not making a power mode transition.

9. A non-transitory recording medium including a computer program causing a computer to perform a method comprising:
receiving, from at least one destination apparatus, a receive window size for use in communication by a communication apparatus with the at least one destination apparatus;
determining a power mode to which transition is to be made, based on the received receive window size;
requesting to perform the determining at a time after transmitting and receiving data to and from the at least one destination apparatus; and
controlling electric power in accordance with the determined power mode, the method further comprising measuring an RTT (Round-Trip Time) between the communication apparatus and the at least one destination apparatus, and determining whether or not a measured value of the RTT is less than a threshold value of the RTT, and when determining that the measured value of the RTT is not less than the threshold value of the RTT, not making a power mode transition.

* * * * *